3,248,312
ELECTROLYTIC OXIDATION OF OLEFINS TO
UNSATURATED ESTERS
Donald C. Young, Fullerton, Calif., assignor to Union Oil
Company of California, Los Angeles, Calif., a corporation of California
No Drawing. Filed Jan. 21, 1963, Ser. No. 252,596
8 Claims. (Cl. 204—80)

This invention relates to the electrolytic oxidation of olefins to unsaturated esters and, in particular, relates to the electrolytic oxidation of ethylene to vinyl acetate.

Recently, it has been proposed that ethylene be oxidized to vinyl acetate by contact with an acetic acid solution containing a soluble palladium salt and a redox chemical. Formation of vinyl acetate results in reduction of palladious ion to the metal and the reduced solution must be regenerated by oxidation. Anhydrous reaction conditions are described for this reaction, since it is reasoned that the presence of water causes the formation of acetaldehyde. To preclude water from the reaction zone, it has been proposed that the regenerative oxidation of the reduced solution be performed in a separate regeneration stage, the reaction mixture dehydrated prior to recycling. In another scheme, it has been proposed that simultaneous regeneration can be performed if the reaction zone is maintained under low pressures so that the water of reaction is vaporized from the reactor.

In practice, these techniques are difficult to control, the former requiring the circulation of a slurry of solids and highly saturated salt solutions which are difficult to handle. Additionally, at the necessary reaction temperatures, the palladium ion tends to oxidize most organic solvents, including acetic acid, employed as the reaction medium. The latter, low pressure technique has a very low conversion rate because of the necessary low pressures to permit vaporization of water from the reaction zone.

The use of oxygen or an oxygen containing gas in the aforedescribed reaction necessarily results in the production of water from the oxidation of the reduced metallic palladium. As previously mentioned, this water production complicates the process and prevents a simple, direct formation of unsaturated esters.

It is an object of this invention to provide a simple direct method for the oxidation of olefins to unsaturate esters.

It is a specific object of this invention to provide a method for the oxidation of ethylene to vinyl acetate.

Other and related objects will be apparent from the following discussion.

I have now found that olefins and in particular ethylene can be readily oxidized to unsaturate esters by contacting the olefin with an organic solution of a complexing ion while applying a positive electromotive force to the solution.

The oxidation system of my invention comprises an electrolytic cell having a cathode and anode chamber separated by a porous membrane with an anolyte comprising an organic solution of the complexing metal and a source of esterifying anion and a conductive catholyte. The porous membrane prevents the metal ions from diffusing into the cathode chamber where they would be reduced. In a preferred embodiment—which is of particular advantage when the reduced form of the complexing metal is the free metal—a second multivalent cation is added to the anolyte to provide an oxidizing environment. In this manner, the concentration of the complexing metal in the anolyte can be greatly decreased without appreciably decreasing the reaction rate. Additionally, the presence of the multivalent metal ions stabilizes the anode solution potential and prevents high overvoltages which would cause decomposition of the product or reactants.

In contrast to the use of oxygen or oxygen-containing gases to maintain the aforedescribed reaction, my electrolytic oxidation does not produce water and, consequently, may be operated at a constant water concentration without the elaborate steps and safeguards suggested by the prior art to remove the water of reaction. The products of my oxidation are the unsaturate ester which is recovered from the anode and a reduced compound, e.g., electrolytic hydrogen from the cathode. The raw materials consumed in the process are an olefin and a source of esterifying anion, e.g., acetic acid.

Referring now to the olefins which can be oxidized to unsaturate esters in accordance with my invention, any olefin having one or more hydrogens on each of the carbons bearing the double bond can be oxidized. In general, any olefin corresponding to the following can be oxidized:

$$R_1-CH=CH-R_2$$

wherein $R_1$ and $R_2$ are hydrogen, aryl, e.g., phenyl, naphthyl, tolyl, xylyl, etc.; alkyl, e.g., methyl, lauryl, isopropyl, butyl, 2-methylhexyl, etc. In general, olefins having from 2 to about 20 carbons are preferred.

Examples of suitable olefins wherein both R groups are alkyl are the alkenes and iso-alkenes. Included in this group are ethylene, propylene, butene-1, butene-2, 3-methyl butene-1, pentene-2, 4-ethyl pentene-1, 3-methyl butene-1, pentene-2, 4-ethyl pentene-1, hexene-1, 4-methyl hexene-2, octene-1, 1,2-diisobutyl ethylene, 3-isopropyl heptene-1, decene-1, etc. Preferably the low boiling olefins having 2 to about 5 carbons are preferred, ethylene is most preferred because of the established commercial value of vinyl esters and because of its reactivity.

Cycloalkyl groups can, of course, be appendant to the olefinic carbons and olefins in which the $R_1$ and $R_2$ groups are joined to form a cyclic moiety can also be oxidized in my invention. Examples of such are indene, cyclohexene, cycloheptene, cyclopentene, 3-cyclohexylpropylene, 1,2-dicyclohexylethylene, 1-cyclooctylbutene-1, etc.

Examples of suitable olefins wherein $R_1$ and/or $R_2$ are aryl are: styrene, β-methyl styrene, allyl benzene, vinyl naphthalene, 3-phenylbutene-1, etc.

The oxidation product, as previously mentioned, is an unsaturate ester. In general, 1-olefins yield as the major product, olefins esterified at the 2-carbon, ethylene yielding vinyl esters, propylene yielding isopropenyl esters, butene-1 yielding isobutenyl esters, etc.

The ester group which is reacted with the olefin can be widely varied and is determined by the anion available in the solution. Preferably a carboxylic acid is employed as the liquid reaction medium and this acid serves as the esterifying reactant. If desired, however, salts of various organic acids can be added to the reaction mixture to serve as a source of esterifying anion. In general, alkyl, aryl, alkaryl, mono- and di-carboxylic acids can be used which have between 1 and about 15 carbons; the lower ($C_1$–$C_5$) aliphatic acids are preferred and of these, acetic is most preferred because of the value of vinyl acetate. Examples of acids suitable as solvents are: formic, acetic, propionic, butyric, isobutyric, valeric, isovaleric, cuproic, isocuproic, caprylic, isocaprylic, benzoic, terephthalic, oxalic, succinic, buteric, adipic, pimelic, suberic, azeilic, lauric, nitrobenzoic, toluic, naphthoic, etc. or mixtures thereof. Various combinations of the aforementioned can be used, e.g. acetic acid can serve as the reaction medium and various salts; preferably alkali metal salts; of any of the aforementional acids can be added to furnish an esterifying anion, e.g., sodium butyrate, potassium terephthalate, lithium benzoate, sodium propionate, cesium valerate, etc. As previously mentioned, however, a lower aliphatic acid is used as the preferred reaction medium and source of esterifying anion.

Examples of various unsaturated esters which can be prepared by my oxidation process are: vinyl acetate, propenyl acetate, butenyl acetate, pentenyl acetate, phenyl ethenyl acetate, phenyl propenyl acetate, cyclohexenyl acetate, vinyl propionate, vinyl isobutyrate, propenyl valerate, vinyl isobutyrate, propenyl valerate, propenyl benzoate, divinyl adipate, monopropenyl succinate, phenyl ethenyl benzoate, divinyl terephthalate, propenyl naphthalate, etc.

While low boiling carboxylic acids having from 1 to about 5 carbon atoms are preferred as the reaction medium and while acetic acid is most preferred, any other organic solvent which is inert can be used for the solvent in the anolyte. Normal, iso- or cycloparaffins such as ethane, isopropane, butane, heptane, pentane, decane, cyclopropane, cyclopentane, cyclohexane, cyclooctane, etc., can be used as well as various aryl or alkaryl hydrocarbons and their halogenated or nitrated derivatives, e.g., benzene, naphthalene, xylene, nitrobenzene, dichlorobenzene, toluene, etc., can be used. Various ethers, such as diisopropyl ether, dibutyl ether, diisoamyl ether, etc.; esters such as methyl formate, methyl acetate, propyl formate, ethyl propionate, propyl acetate, butyl formate, ethyl butyrate, amyl acetate, amyl butyrate, etc., nitrated paraffins, e.g., nitropropane, nitropentane, etc. can also be used as the organic solvent.

The anolyte thus comprises an organic solution containing soluble esterifying anions and in a preferred embodiment comprises an acetic acid solution of an alkali metal acetate. Also present in the anolyte is a complexing metal. The metals which readily form olefin complexes include the following: platinum, palladium, iridium, vanadium, mercury, rhodium, gold and ruthenium and of these palladium is preferred because of its greater activity. In general, the metal can be added to the anolyte in any form such as free metal or soluble salts, e.g., palladium chloride, platinum bromide, vanadium acetate, rhodium chloride, mercuric sulfate, etc.

I have discovered that the halides tend to decrease the reactivity of the complexing metal in the anolyte and, accordingly, the non-halogen containing salts are preferred so as to perform the oxidation in a halogen-free environment. Consequently, the preferred salts are the complexing metal salts of carboxylic acids, e.g., platinum acetate, iridium propionate, palladium acetate, vanadium benzoate, rhodium valerate, ruthenium acetate, etc. To prevent the production of a host of unsaturate esters, it is preferred that the anion of the complexing metal salt introduced be the same as the esterifying anion employed in the reaction. Thus, in its simplest embodiment, the anolyte comprises an acetic acid solution of an alkali metal acetate and palladium acetate.

As previously mentioned, a multivalent cation can also be employed in the anolyte to provide an oxidizing environment and obviate the need for the reduced form of the complexing ion to migrate to the anode for oxidation. This embodiment is particularly of value when the complexing ion in its reduced form is the free metal, since the resultant colloidal particles will instantaneously be oxidized by the multivalent ions in the solution without need to migrate to the anode. Because the lower valence state of the multivalent ion is still soluble in the anolyte, it remains as a mobile ion and readily returns to the anode for electrolytic oxidation.

The metals which can be employed in the anolyte to provide an oxidizing environment are, in general, those which are soluble in the anolyte in all their valence states and which will oxidize the reduced form of the complexing metal in the anolyte. The oxidation potential of the metal should also be more positive than the voltage for decomposition of the anolyte or unsaturate ester to avoid the decomposition of these materials at the anode. In general, the following metals can be used: iron, thallium, manganese, cobalt, silver, copper, cerium and mixtures thereof. These metals are added to the anolyte preferably as soluble salts, e.g., chlorides, sulfates, nitrates, etc. The preferred salts are the carboxylic acid salts which preferably are of the same acid as the solvent and/or as the complexing metal salt to avoid introducing more than one esterifying anion. Examples of preferred salts are those of the $C_2$-$C_5$ carboxylic acids, e.g., ferric acetate, mercuric acetate, thallium propionate, etc.

As previously mentioned, the use of such a multivalent ion also tends to "buffer" the cell voltage and prevent the anolyte potential from increasing to a level where the anolyte or oxidized product would be decomposed. In this manner, the applied voltage can be increased to provide the maximum current density without danger of decomposing the anolyte or oxidizing the olefin past the ester state.

The concentration of the complexing metal in the anolyte can be between about 3 and about 0.03 weight percent. The actual concentration of dissolved ions of the complexing metal is generally very low; less than about $10^{-3}$ to $10^{-5}$ molar because the reduction of these ions to the metal is a very rapid reaction with most olefins, particularly ethylene. When ions of one of the aforementioned multivalent metals are also incorporated in the anolyte, the concentration of the complexing metal can be very low, concentrations of between about 10 and 10,000 parts per million being sufficient for high reaction rates.

The metal of multivalent ions, when added to the anolyte, can be used in amounts between about 0.1 and 10 weight percent (calculated as the metal); preferably in amounts between about 0.3 and about 3 weight percent. The concentration of this metal should be sufficient to provide an effective oxidation potential which is more negative than that of the complexing metal. In general, the weight ratio of multivalent metal to complexing metal should be between about 10:1 and about 1000:1, preferably between about 10:1 and 50:1 to maintain a solution potential sufficient to oxidize the reduced complexing metal.

The catholyte used in my electrochemical oxidation can, in general, be any aqueous conductive solution. I prefer that the salts which are dissolved in the catholyte be soluble and compatible with the complexing with multivalent ions of the anolyte, since a slight degree of mixing of these solutions often occurs. Preferably, the catholyte is of neutral or acidic pH, and for maximum conductivity, acid values, e.g., pH of 4.0 or less, are preferred.

Aqueous solutions of mineral acids can be used for the catholyte, e.g., sulfuric, nitric, acetic, hydrochloric, etc., in concentrations from about 0.1 to about 10 molar. A chemical reduction occurs at the cathode and a variety of such reactions can be performed if desired. To illustrate, the hydrogenation of naphthalene to tetralin or decalin or of benzene to cyclohexane can be secured by introducing these aromatics into the cathode chamber. Other inorganic reductions, e.g., the reduction of metal oxides and salts to metals can be used to produce zinc, copper, sodium metal, etc., in this chamber if desired. Preferably, however, the oxidation in the anode chamber is not complicated by imposing additional current density and voltage requirements for a particular reduction in the cathode chamber, but rather, the reduction of hydrogen ions to liberate electrolytic hydrogen is performed in the cathode.

Various mechanical designs of electrolytic cells can be used in my oxidation. In general, two chambers are used which are separated by a porous diaphragm to prevent admixture of the electrolytes. These chambers are preferably equipped with mechanical stirrers to maintain a high degree of mixing and heating elements are used to maintain the desired reaction temperature. The anode chamber can be composed of or lined with stainless steel or any similar corrosion resistant material. The anode can be of carbon or any inert metal, i.e., any metal having an oxidation potential more negative than the oxidizing or multivalent metal of the anolyte. Generally, carbon electrodes are preferred.

The cathode chamber is preferably constructed of, or lined with, stainless steel or other similar corrosion resistant metals; however, mild or carbon steel can be used when the walls of the cathode chamber are used as the cathode by applying the negative potential of the cell thereto. Generally, current densities greater than about 0.4 ampere per square centimeter are used in this chamber and at this current density, substantially no corrosion of mild steel occurs.

The cell chambers are separated by a porous membrane which prevents diffusion of the metal ions from the anolyte into the cathode chamber. In general, various ceramic materials such as fritted glass or sintered glass powders can be used. Other suitable membranes can be porous or foamed plastics such as Teflon, asbestos, etc.

The mechanical design of the cell can be widely varied. The cell can comprise separate vessels in juxtaposition communicating with each other by a self bridge or common arm which contains the porous membrane. If desired, the chambers can be provided within a single vessel by dividing the vessel with a wall, a portion or all of which comprises the aforementioned porous membrane. In a preferred design, the chambers are concentrically positioned cylinders having a steel outer vessel to be used as the cathode and an inner concentric cylinder composed of the porous membrane. Within the latter is disposed a carbon rod which, preferably is fluted, to be used as the anode. An inlet for the olefin and recycle anolyte and an outlet for removal of the anolyte are provided in the interior of the porous membrane (the anode chamber) and a gas outlet is provided in the annular chamber between the porous membrane and the outer vessel (the cathode chamber).

The conditions of oxidation within the anode chamber are as follows:

TABLE 1

| Condition | Broad | Preferred |
|---|---|---|
| Current Density (amperes per sq. cm.) | 0.4 to 4×10⁻⁵ | 10⁻² to 10⁻⁵ |
| Voltage (volts) | 2–100 | 2–10 |
| Pressure (p.s.i.a.) | 1–1,000 | 10–100 |
| Temperature (° F.) | 50–250 | 100–200 |

The oxidation of the olefin can be conducted at atmospheric pressures; however, if desired, the anolyte can be maintained at approximately the boiling point of the unsaturate ester so that this product is readily removed by distillation without withdrawal of the anolyte solution. In general, however, at temperatures above about 225° F., the complexing metal tends to oxidize most organic solvents including the preferred carboxylic acid solvent. Accordingly, it is preferred not to exceed temperatures of about 225° F. and most preferably not to exceed temperatures above about 200° F. Since most products will distill above this temperature, the preferred embodiment of the process comprises a continuous removal of a portion of the anolyte which is distilled to recover the unsaturate ester and recycled to the anode chamber. When the preferred technique is used, high reaction pressures are preferably employed in the anode chamber to effect a high olefin solubility in the anolyte. The following illustrates my invention:

*Example*

An electrolytic cell was constructed from a 12 x 6 inch glass T and a 6 x 6 inch glass T by placing each T on end to form a first vertical 12-inch diameter cylinder and a second vertical 6-inch diameter cylinder. The 6-inch side outlets of each T were flanged together and a porous glass disc was placed in the flange joint. Cover plates were placed on the upper and lower ends of the glass T's with appropriate connections to drain the solutions and remove vapor products. A 6-inch diameter graphite cylinder was placed in the 12-inch diameter chamber with an electrical lead to serve as an anode and a stirrer, thermowell and electric immersion heaters were also placed in this chamber. A 1½-inch diameter graphite rod was placed in the 6-inch diameter vessel to serve as a cathode. A stirrer, thermowell and immersion heater were also placed in this vessel.

An anolyte comprising anhydrous acetic acid containing 0.03 weight percent palladium and 10 weight percent lithium acetate was charged to the 12-inch chamber. A 1 normal (4.8 percent) solution of sulfuric acid was charged to the 6-inch chamber for the catholyte. The electrolytes were heated to 240° F. and a direct current voltage of 9.9 volts was applied to the cell to obtain a current density of .05 ampere per square centimeter of anode surface. The electrolytes were stirred while ethylene was slowly passed into the anode chamber. The chambers were maintained at atmospheric pressure and the gaseous effluent of the anode was passed through a reflux condenser and into condensate collectors cooled with an acetone-dry ice mixture. The liquid condensate in the traps was collected and found to have the following composition:

| | Percent |
|---|---|
| Vinyl acetate | 23 |
| Acetic acid | 77 |

The vinyl acetate was recovered in a substantially pure state by subsequent distillation of the condensate.

Substantially the same results can be obtained at a slightly lower conversion rate when platinum or vanadium salts are used in lieu of the palladium.

When propylene is charged to the anode chamber in lieu of ethylene, propenyl acetate is obtained as the major product.

The preceding examples are intended solely to illustrate my invention and are not to be construed as unduly limiting thereof. My invention is intended to be defined by the method steps, or their equivalents, set forth in the following claims.

I claim:

1. A process for the oxidation, in an electrolytic cell having anode and cathode chambers separated by a porous member, of a hydrocarbon mono-olefin to an unsaturated ester which comprises introducing said mono-olefin into said anode chamber of said electrolytic cell to contact therein an anolyte comprising an organic solvent containing an esterifying monocarboxylate anion and from about 0.03 to 3.0 weight percent, calculated as the metal, of a catalyst comprising a soluble salt of an olefin complexing metal selected from the class consisting of platinum, palladium, iridium, vanadium, rhodium, gold, ruthenium, mercury and mixtures thereof to reduce said complexing metal to a lower oxidation state by said contacting with said mono-olefin while simultaneously oxidizing said metal to regenerate the same in said anodic zone by applying a voltage to the electrodes of said cell to pass a direct current through said cell and recovering said unsaturated ester as a product from said cell.

2. The process of claim 1 wherein said anolyte comprises an acetic acid solution of palladium and said esterifying anion is acetate.

3. The process of claim 1 wherein said olefin is ethylene and said ester is vinyl acetate.

4. The oxidation of ethylene to vinyl acetate which comprises introducing ethylene into the anode chamber of an electrolytic cell having anode and cathode chambers separated by a porous member to contact therein an acetic acid anolyte containing from 0.03 to 3.0 weight percent, calculated as the metal of a soluble salt of palladium and an alkali metal acetate to reduce said salt of palladium to palladium metal while simultaneously oxidizing said palladium to regenerate the same in said anode chamber by applying a direct current voltage to said cell and maintaining a current density between about $10^{-2}$ and about $10^{-5}$ amperes per square centimeter of anode surface in said anode chamber, maintaining the temperature of said anolyte between about 100° and about 200° F., withdrawing a crude product from said anode chamber and separating said vinyl acetate from said crude product.

5. The process of claim 1 wherein the temperature of the anode chamber is maintained between 50° and 250° F. and the pressure is maintained between 1 to 1000 p.s.i.a. and said voltage applied to said cell is from 2 to 100 volts, sufficient to provide a current density of from 0.4 to $4 \times 10^{-5}$ amperes per square centimeter in said anode chamber.

6. The oxidation of claim 4 wherein the said anode chamber is maintained at a pressure from 1 to 1000 p.s.i.a.

7. The oxidation of claim 1 wherein said anolyte is a substantially anhydrous carboxylic acid.

8. The oxidation of claim 4 wherein said acetic acid is substantially anhydrous.

References Cited by the Examiner
UNITED STATES PATENTS

| | | | |
|---|---|---|---|
| 2,680,713 | 6/1954 | Lindsey et al. | 204—59 |
| 3,147,203 | 9/1964 | Klass | 204—80 |

FOREIGN PATENTS

| | | |
|---|---|---|
| 928,739 | 6/1963 | Great Britain. |

JOHN H. MACK, *Primary Examiner.*